(12) United States Patent
Good (10) Patent No.: US 9,936,206 B2
(45) Date of Patent: *Apr. 3, 2018

(54) DISTRIBUTED ENCODING OF A VIDEO STREAM

(71) Applicant: WOWZA MEDIA SYSTEMS, LLC, Golden, CO (US)

(72) Inventor: Charles F. Good, Cincinatti, OH (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/259,568

(22) Filed: Sep. 8, 2016

(65) Prior Publication Data
US 2016/0381367 A1   Dec. 29, 2016

Related U.S. Application Data

(63) Continuation of application No. 14/869,221, filed on Sep. 29, 2015, now Pat. No. 9,467,706, which is a
(Continued)

(51) Int. Cl.
*H04N 7/12* (2006.01)
*H04N 19/162* (2014.01)
(Continued)

(52) U.S. Cl.
CPC ........... *H04N 19/162* (2014.11); *H04N 19/40* (2014.11); *H04N 19/46* (2014.11);
(Continued)

(58) Field of Classification Search
CPC .................................................. H04N 19/162
(Continued)

(56) References Cited

U.S. PATENT DOCUMENTS 8,396,114 B2    3/2013  Gu et al.
2003/0210821 A1*  11/2003  Yogeshwar ............ H04N 19/40
                                                            382/232
(Continued)

FOREIGN PATENT DOCUMENTS

WO       2011041916 A1     4/2011

OTHER PUBLICATIONS

"Compressor 4", http://www.apple.com/finalcutpro/compressor, retrieved on Apr. 16, 2013, 4 pages.
(Continued)

*Primary Examiner* — Richard Torrente
(74) *Attorney, Agent, or Firm* — Toler Law Group, PC (57) ABSTRACT

A method includes receiving input at a computing device, where the input indicates a value of a local encoding parameter, indicates a value of a remote encoding parameter, and identifies a first subset of streams and a second subset of streams. The first subset and the second subset correspond to renditions of a video stream. The method further includes sending, to a media server, the first subset and the value of the remote encoding parameter, where the first subset includes a particular rendition of the video stream generated using a lossless encoding scheme, and wherein the media server is configured to generate the second subset of streams based on the value of the remote encoding parameter and based on the particular rendition.

20 Claims, 5 Drawing Sheets

Related U.S. Application Data continuation of application No. 13/923,069, filed on Jun. 20, 2013, now Pat. No. 9,179,159.

(51) Int. Cl.
  *H04N 19/46* (2014.01)
  *H04N 19/40* (2014.01)
  *H04N 21/2343* (2011.01)
  *H04N 21/2662* (2011.01)
  *H04N 21/643* (2011.01)
  *H04N 21/84* (2011.01)

(52) U.S. Cl.
  CPC ... *H04N 21/23439* (2013.01); *H04N 21/2662* (2013.01); *H04N 21/64322* (2013.01); *H04N 21/84* (2013.01)

(58) Field of Classification Search
  USPC .................................................. 375/240.07
  See application file for complete search history.

(56) References Cited

U.S. PATENT DOCUMENTS

| | | | |
|---|---|---|---|
| 2008/0181298 A1* | 7/2008 | Shi | H04N 21/23432 375/240.03 |
| 2012/0219054 A1 | 8/2012 | Daub et al. | |
| 2012/0219271 A1* | 8/2012 | Vunic | G06K 9/00711 386/278 |
| 2013/0014185 A1 | 1/2013 | Saraf et al. | |
| 2013/0058393 A1 | 3/2013 | Soroushian | |
| 2013/0067036 A1 | 3/2013 | Nooney et al. | |

OTHER PUBLICATIONS

"Top Features," http://www.encodingbooth.com/top-features.html, retrieved on May 7, 2013, 4 pages.

* cited by examiner

DISTRIBUTED ENCODING OF A VIDEO STREAM

CROSS-REFERENCE TO RELATED APPLICATIONS

The present application is a continuation of and claims priority to U.S. patent application Ser. No. 14/869,221, filed Sep. 29, 2015, now issued as U.S. Pat. No. 9,467,706, which is a continuation of U.S. patent application Ser. No. 13/923,069, filed Jun. 20, 2013, now issued as U.S. Pat. No. 9,179,159, the content of each of which is incorporated by reference herein in its entirety.

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

To stream a live event, a content provider may capture video of the live event and may encode the captured video at the site of the live event. The encoded video may be provided to servers that stream the encoded video to various user devices. Because different user devices may have different resolutions, computing capabilities, and/or bandwidths, multiple versions of the live video may need to be generated at the capture site, which increases processing complexity and cost.

SUMMARY

Systems and methods of distributing encoding of a video stream between a "local" computing device and a "remote" media server are disclosed. For example, in accordance with the described techniques, a local computing device (e.g., at the capture site) may be responsible for encoding some, but not all, adaptive bitrate renditions of the video stream. The computing device may send the locally encoded rendition(s) to the media server, which uses the locally encoded rendition(s) to generate the remaining (e.g., remotely encoded) rendition(s). The media server may also package the locally encoded and the remotely encoded renditions for adaptive streaming to destination devices. In some implementations, the local computing device may generate and display a graphical user interface (GUI). A user may provide input via the GUI. The user input may indicate whether each particular adaptive bitrate rendition is to be generated locally by the computing device or remotely by the media server. The user input may also provide values for one or more local encoding parameters (which are used to generate the locally encoded rendition(s)) and one or more remote encoding parameters (which are sent to the media server for use in generating the remotely encoded rendition(s)).

By distributing encoding responsibilities between the computing device and the media server, processing resources at the computing device (e.g., the capture site) may be reduced. Further, the total bandwidth of all available adaptive bitrate renditions offered by the media server can exceed the available bandwidth needed between the computing device and the media server. Increasing the number of available adaptive bitrate renditions may provide greater streaming flexibility in the presence of varying network conditions, leading to fewer bandwidth-related playback interruptions at destination devices.

DETAILED DESCRIPTION

Figure 1:
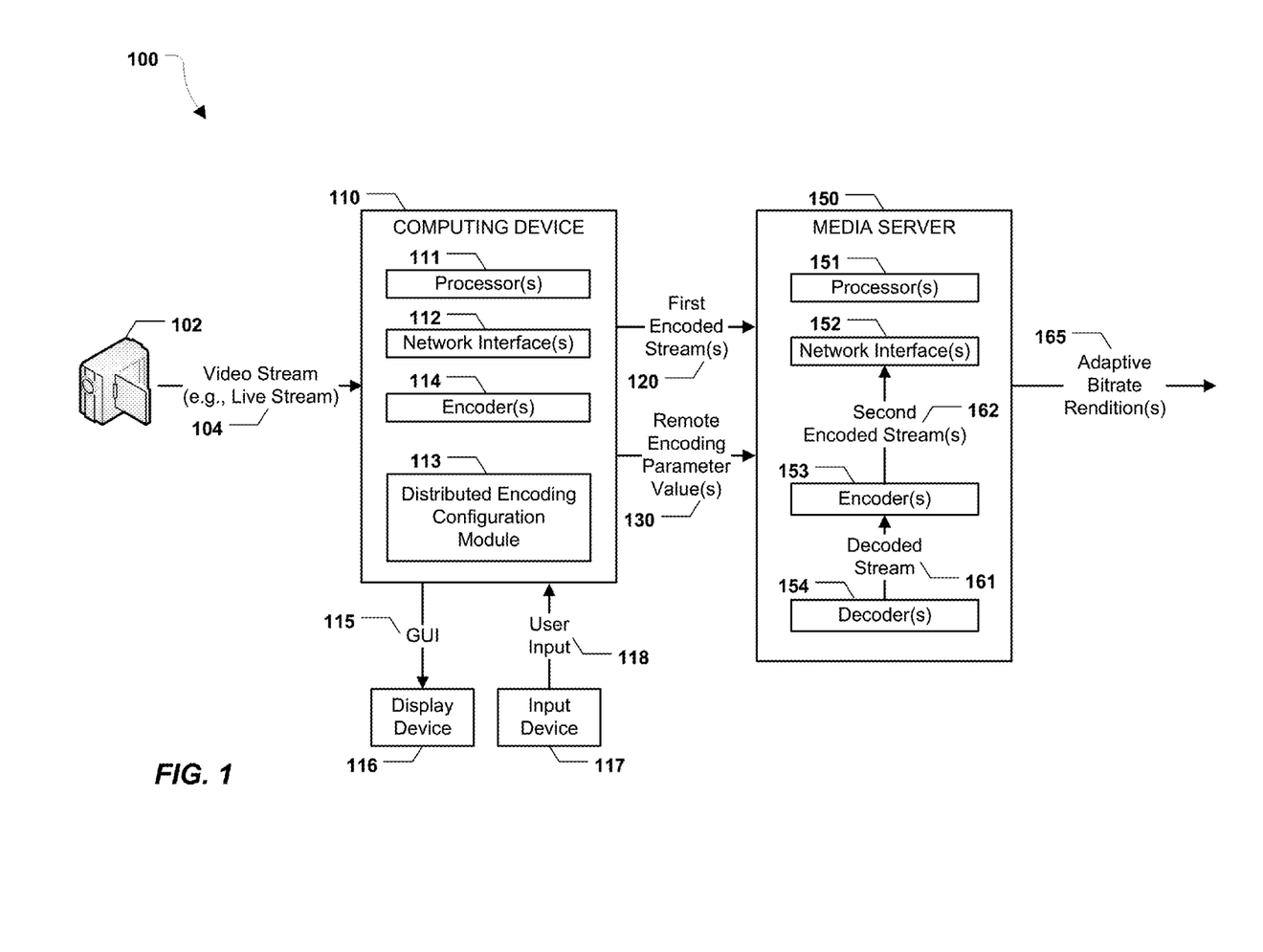
FIG. 1 is a diagram of a particular embodiment of a system that is operable to distribute encoding of a media stream between a computing device and a media server.

FIG. 1 illustrates a particular embodiment of a system 100 that is operable to distribute encoding of a video stream 104 between a computing device 110 and a media server 150.

The computing device 110 may be a desktop computer, a laptop computer, a server computer, a mobile device (e.g., a mobile phone, a smartphone, a tablet computer, etc.), or any combination thereof, and may be configured to send data to and receive data from the media server 150. The computing device 110 may include one or more processors 111 and one or more network interfaces 112. For example, the network interface(s) 112 may include input interface(s) and output interface(s) that are configured to receive data and to send data, respectively. In a particular embodiment, the network interface(s) 112 may be wired and/or wireless interfaces that enable the computing device 110 to communicate data via a network, such as a local area network (LAN) or the Internet. For example, the network interface(s) 112 may include an Ethernet interface, a wireless interface compatible with an Institute of Electrical and Electronics Engineers (IEEE) 802.11 (e.g., Wi-Fi) protocol, or other wired or wireless interfaces.

The computing device 110 may receive the video stream(s) 104 from a capture source (e.g., a camera 102, capture hardware, etc.). Alternately, the video stream 104 may be captured at a location remote from the computing device 110 and may be received via the network interface(s) 112. In a particular embodiment, the video stream 104 is a live video stream.

Figure 2:
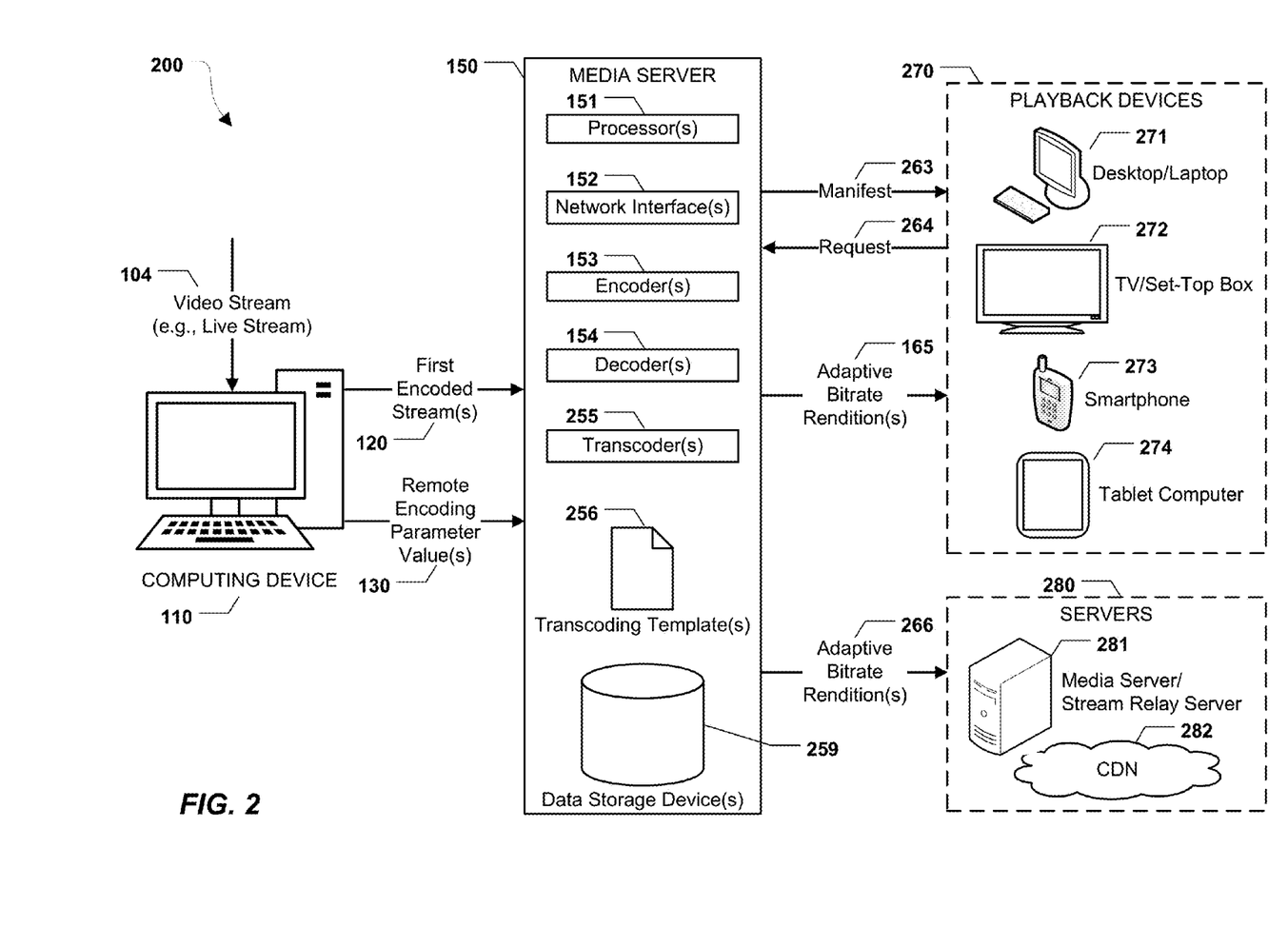
FIG. 2 is a diagram of another particular embodiment of a system that is operable to distribute encoding of a media stream between a computing device and a media server.

The computing device 110 may also include a distributed encoding configuration module 113 and one or more encoders 114, each of which may be implemented using hardware and/or software (e.g., instructions executable by the processor(s) 111). In a particular embodiment, the distributed encoding module 113 may be part of a software application provided by a vendor of the media server 150. The distributed encoding configuration module 113 may generate a graphical user interface (GUI) 115 and may send the GUI 115 to a display device 116 (e.g., a computer monitor). The GUI 115 may include options to define various encoding parameters. For example, the GUI 115 may be used to define values of local encoding parameters that are to be used by the computing device 110 to encode the received video stream 104. As another example, the GUI 115 may be used to define values of remote encoding parameters to be used by the media server 150. For example, when adaptive bitrate streaming is supported by the media server 150, the GUI 115 may include options to define the available renditions of the video stream 104 and whether each of the renditions is to be generated by the computing device 110 or by the media server 150. Examples of encoding parameters include, but are not limited to, a frame size, a bitrate, a video coder/decoder (CODEC), an audio CODEC, an audio sampling rate, and a number of audio channels. The GUI 115 may also include options to define video capture settings, such as configuration settings of the camera 102. In a particular embodiment, the GUI 115 may include GUI elements corresponding to configuration options. For example, the GUI 115 may include text fields, drop-down menus, etc. operable to select from preset streaming profiles (e.g., combinations of parameter values) and/or to create custom streaming profiles.

A user (e.g., administrator or owner of the computing device 110) may interact with the GUI 115 using an input device 117 (e.g., a keyboard, a mouse, a touchscreen, etc.), and the distributed encoding configuration module 113 may receive user input 118 from the input device 117. The user input 118 may include values for local and remote encoding parameters. The user input 118 may also include capture settings (e.g., corresponding to parameters of the camera 102) and adaptive streaming groups (e.g., input indicating that renditions A, B, and C are for mobile devices, renditions X, Y, and Z are for desktop/laptop computers, and renditions M and N are for set-top boxes (STBs)).

In a particular embodiment, the GUI 115 may be used to configure adaptive bitrate streaming of the video stream 104 by the media server 150. To illustrate, the user input 118 may indicate bitrates, frame sizes, selected CODECs, etc. of adaptive bitrate renditions of the video stream 104 that are to be offered by the media server 150. The user input 118 may also indicate whether each adaptive bitrate rendition is to be generated at the computing device 110 or at the media server 150. Thus, encoding responsibilities may be split between the computing device 110 and the media server 150 in a manner selected by a user via the GUI 115. Adaptive bitrate streaming is further described with reference to FIG. 2.

In a particular embodiment, the GUI 115 may include information to aid the user in deciding what adaptive streaming renditions should be generated and where such renditions should be generated. For example, the GUI 115 can include information indicating relative computing capabilities (e.g., processor information, memory information, etc.) of the computing device 110 and the media server 150. The GUI 115 may also include information regarding available network bandwidth between the computing device 110 and the media server 150 and information regarding outbound bandwidth available to the media server 150 for streaming to destination devices. In one example, the GUI 115 may indicate "default" (e.g., static) encoding parameter values that will be used unless overwritten by the user. For example, the default encoding parameters, including where each rendition of the video stream 104 will be generated, may be dynamically determined by the module 113 based on the relative computing capabilities of, and the bandwidth between, the computing device 110 and the media server 150.

When the user input 118 indicates that the computing device 110 is to generate one or more of the renditions, the computing device 110 may use the encoder(s) 114 to generate a first encoded stream(s) 120 corresponding to the renditions. The computing device 110 may send the first encoded stream(s) 120 to the media server 150. The computing device 110 may also send values 130 of remote encoding parameters to the media server 150, so that the media server 150 can use the values 130 of the remote encoding parameters to generate the remaining renditions of the video stream 104. When the user input 118 indicates that all renditions are to be remotely generated by the media server 150, the computing device 110 may forward the video stream 104 (or an encoded/compressed (e.g., lossless compression) version thereof) to the media server 150. The lossless compression scheme may be selected by the user or may be a default scheme.

The media server 150 may include one or more processors 151 and various components that are executable by the processor(s) 151. The media server 150 may correspond to or include software application(s) that perform media serving or processing, hardware systems (e.g., servers) that support or perform media serving and processing, or any combination thereof. Thus, various operations described with reference to the media server 150, or components thereof, may be implemented using hardware, software (e.g., instructions executable by the processor(s) 151), or any combination thereof. In a particular embodiment, the media server 150 may be provided by a third party streaming service that is distinct from an owner of the computing device 110. For example, the third party streaming service may be associated with a cloud computing provider or a content delivery network (CDN) provider.

The media server 150 may include one or more network interfaces 152. For example, the network interface(s) 152 may include input interface(s) and output interface(s) that are configured to receive data and to send data, respectively. In a particular embodiment, the network interface(s) 152 may be wired and/or wireless interfaces that enable the media server 150 to communicate data via a network, such as the Internet. For example, the network interface(s) 152 may include an Ethernet interface, a wireless interface compatible with an IEEE 802.11 (e.g., Wi-Fi) protocol, or other wired or wireless interfaces.

The media server 150 may also include encoder(s) 153 and decoder(s) 154, each of which may be implemented using hardware and/or software (e.g., instructions executable by the processor(s) 151). The decoder(s) 154 may decode one of the received first encoded stream(s) 120 to generate a decoded stream 161. The encoder(s) 153 may re-encode the decoded stream 161 in accordance with the received value(s) 130 of the remote encoding parameters to generate one or more second encoded streams 162. For example, the second encoded stream(s) 162 may have larger or smaller bitrates, frame sizes, etc. as compared to the first encoded stream(s) 120. The media server 150 may stream adaptive bitrate rendition(s) 165 of the video stream 104 to destination devices, such as playback devices or other servers. The adaptive bitrate rendition(s) 165 may include at least one of the first encoded stream(s) 120 and/or at least one of the second encoded stream(s) 162.

During operation, the computing device 110 may receive the video stream 104, may generate the GUI 115, and may receive the user input 118. The user input 118 may include or indicate values of local encoding parameters and remote encoding parameters. When the user input 118 indicates that one or more adaptive bitrate renditions of the video stream 104 are to be locally generated, the computing device 110 may generate the local adaptive bitrate renditions (e.g., based on the local parameter values) and transmit such renditions to the media server 150 as part of the first encoded stream(s) 120. The computing device 110 may also transmit the value(s) 130 of the remote encoding parameters to the media server 150. When the user input 118 indicates that one or more adaptive bitrate renditions of the video stream 104 are to be remotely generated, the media server 150 may decode and re-encode video data using the user-selected remote encoding parameter value(s) 130 to generate the second encoded stream(s) 162. At least one of the first encoded stream(s) 120 and/or at least one of the second encoded stream(s) 162 may be provided by the media server 150 as the adaptive bitrate rendition(s) 165.

The system 100 of FIG. 1 may thus enable distributed encoding and generation of video streams, such as distributed encoding of adaptive bitrate renditions of a live stream. Such distributed encoding may reduce an amount of processing resources needed at a computing device located at a video capture site and reduce the total bandwidth needed between the video capture site and the media server. Further, higher quality renditions and/or a larger number of renditions may be provided to viewers as compared to a system limited to encoding all adaptive bitrate renditions locally at the capture site.

To illustrate, an available bandwidth of a communication path between the computing device 110 and the media server 150 may be ten megabits per second (Mbps). If all adaptive bitrate renditions were generated locally at the computing device, the total (i.e., sum) of the bitrates of the renditions would need to be less than ten Mbps, for the live event to be provided to the media server 150 to destination devices with minimal interruption. Thus, regardless of the outbound bandwidth available to the media server 150 for streaming to end-user devices, the bandwidth between the computing device 110 and the media server 150 presents a potential bottleneck. In contrast, the system 100 of FIG. 1 may enable the total adaptive streaming bitrate provided to viewers to exceed ten Mbps. To illustrate, the following ten adaptive streaming renditions may be made available to users: 64 kilobits per second (kbps) audio-only, 264 kbps, 464 kbps, 664 kbps, 1264 kbps, 1864 kbps, 2564 kbps, 4564 kbps, 6564 kbps, and 8564 kbps. The first three renditions may be recommended for cellular connections and the remaining renditions may be recommended for wireless data (e.g., Wi-Fi) connections. In alternate embodiments, more than ten renditions or less than ten renditions may be available for adaptive streaming. It will be appreciated that the total bitrate for the above ten renditions is over twenty-six Mbps. Thus, the computing device 110 would not be able to simultaneously transmit all ten renditions to the media server 150. However, in accordance with the described techniques, the computing device 110 may locally generate and transmit only the 64 kbps audio-only rendition and the highest-available-quality 8564 kbps rendition, which have a total bandwidth of less than ten Mbps. The remaining renditions may be remotely generated by the media server 150. The system 100 of FIG. 1 may thus increase the number of available adaptive bitrate renditions, which may provide greater streaming flexibility in the presence of varying network conditions, leading to fewer bandwidth-related playback interruptions at destination devices.

FIG. 2 illustrates another particular embodiment of a system 200 that is operable to distribute encoding of the video stream 104 between the computing device 110 and the media server 150. The media server 150 may be configured to send and receive data from various other devices. For example, the media server 150 may communicate with one or more playback devices 270 (e.g., devices that are configured to stream video content) and one or more other servers 280.

Examples of playback devices include a smartphone, a tablet computer, a laptop computer, a desktop computer, a set-top box, a television, a portable media player, a game console, etc. In the embodiment of FIG. 2, the playback devices 270 include a desktop/laptop computing device 271, a television (TV)/set-top box 272, a smartphone 273, and a tablet computer 274. Examples of servers include a media server, a stream relay server, a server of a content distribution network (e.g., an edge server), etc. In the embodiment of FIG. 2, the other servers 280 include a media server/stream relay server 281 and a server of a content distribution network (CDN) 282. Adaptive bitrate rendition(s) 165, 266 may be transmitted by the media server 150 using an adaptive streaming protocol, as further described herein.

In a particular embodiment, the media server 150 can convert media data (e.g., audio and/or video data) from one format or transmission protocol to multiple other formats or transmission protocols. For example, video streams received and transmitted by the media server 150 may be associated with the same encoding format and transmission protocol or may be associated with different encoding formats and transmission protocols. In a particular embodiment, the media server 150 may generate video streams by performing video decoding, encoding, transcoding, and/or transmuxing operations (e.g., to modify a video encoding format, an audio encoding format, a bitrate, an aspect ratio, packaging, etc.). In a transmuxing operation, encoded audio and video may be repackaged without modifying the encoded audio and video.

Thus, the media server 150 may include various components configured to perform stream processing functions. For example, the media server 150 may include one or more video processing components, such as the encoders 153, the decoders 154, and transcoders 255, each of which may be implemented using hardware, software, or both. To illustrate, one or more of the encoder(s) 153, decoder(s) 154, and transcoder(s) 255 may be implemented using Java classes (e.g., executable by a Java Virtual Machine (JVM)), C++ instructions, C instructions, etc. The decoder(s) 154 may decode data received by the media server 150. For example, the decoder(s) 154 may decode received streams (e.g., live audio-only, video-only, or audio-video streams). The encoder(s) 153 may encode data that is to be transmitted by the media server 150. The transcoder(s) 255 may be configured to perform bitrate conversion, CODEC conversion, frame size conversion, etc. In a particular embodiment, a transcoding operation performed by the transcoder(s) 255 may trigger a decoding operation by the decoder(s) 154 and/or a re-encoding operation by the encoder(s) 153. In a particular embodiment, parameters used by the transcoder(s) 255 are stored in one or more transcoding templates 256 at the media server 150. The encoder(s) 153, decoder(s) 154, and transcoder(s) 255 may thus enable the media server 150 to process data in accordance with multiple coding technologies and protocols.

For example, the media server 150 may support video encoding types including, but not limited to, H.264, On2 VP6, Sorenson Spark, Screen video, Screen video 2, motion picture experts group (MPEG) 2 (MPEG-2), and MPEG-4 Part 2. The media server 150 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 150 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 150 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

In a particular embodiment, the media server 150 includes one or more data storage devices 259 (e.g., random access memory (RAM), disk-based storage, solid-state non-volatile memory, etc.). The data storage device(s) 259 may store stream data (e.g., frames of a live video stream), files, closed caption data, images (e.g., to be overlaid on top of a video stream), etc. To illustrate, the data storage device(s) 259 may buffer portions of the first encoded stream(s) 120 and the second encoded stream(s) 162 for adaptive streaming delivery to destination devices.

During operation, the computing device 110 may generate (e.g., based on local parameter values) and transmit one or more adaptive streaming renditions to the media server 150 as part of the first encoded stream(s) 120. The computing device 110 may also transmit the value(s) 130 of remote encoding parameters to the media server 150. The media server 150 may decode and re-encode video data to generate second encoded stream(s) (e.g., the second encoded stream(s) 162 of FIG. 1). At least one of the first encoded stream(s) 120 and/or at least one of the second encoded stream(s) may be provided by the media server 150 as the adaptive bitrate rendition(s) 165, 266.

In a particular embodiment, the media server 150 may generate an adaptive streaming manifest 263 based on data received from the computing device 110. Alternately, the manifest 263 may be generated by the computing device 110 based on the user input 118 and may be transmitted to the media server 150. The manifest 263 may include information describing each of the adaptive bitrate renditions 165, 266 that is available for adaptive streaming. To initiate an adaptive streaming session, a destination device, e.g., the computing device 271, may request the manifest 263. Upon receiving the manifest 263, the computing device 271 may determine which of the available renditions should be requested from the media server 150. For example, the computing device 271 may make such a determination based on buffering/processing capability at the computing device 271 and/or network conditions (e.g., bandwidth) being experienced by the computing device 271.

Upon determining which rendition should be requested, the computing device 271 may transmit a request 264 to the media server 150. The request 264 may specify a particular portion (e.g., portion "X") of the requested rendition. The particular portion may be specified using start/end frame numbers, start/end times, a portion number/identifier, etc. Depending on the adaptive streaming protocol in use, the requested portion may correspond to a "chunk" of a rendition and/or a group of pictures (GOP). A "chunk" may refer to a fixed (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the computing device 271 may request a subsequent portion (e.g., portion "X+1") of the same rendition. However, if playback and/or network conditions become worse, the computing device 271 may switch to a lower bitrate rendition by requesting subsequent portions of the lower bitrate rendition. Conversely, if playback and/or network conditions improve, the computing device 271 may switch to a higher bitrate rendition. The media server 150 and the computing device 110 may generate key frame aligned portions for the adaptive streaming renditions, so that switching to a lower bitrate or higher bitrate rendition appears "seamless" (e.g., does not result in noticeable visual glitches or dropped frames).

The system 200 of FIG. 2 may thus enable distributed encoding of adaptive streaming renditions, including dynamic generation of an adaptive streaming manifest and simultaneous streaming to multiple playback devices 270 and/or servers 280. In one embodiment, the distributed encoding techniques described with reference to FIGS. 1-2 may be cloud-hosted and may be provided to customers/subscribers (e.g., video content providers) for a fee (e.g., a per-hour or per-byte fee).

Figure 3:
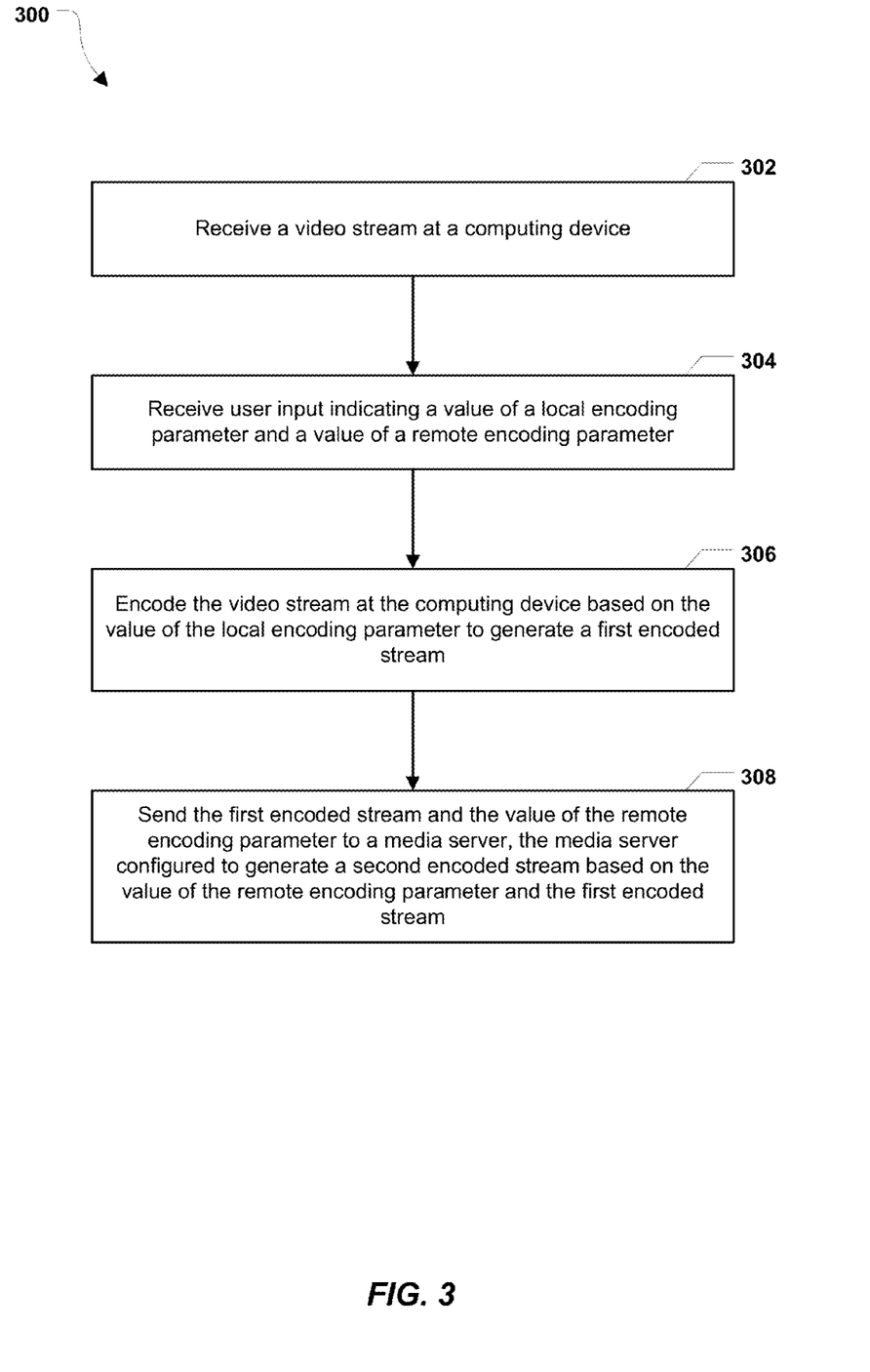
FIG. 3 is a flowchart of a first particular embodiment of a method of operation at the computing device of FIG. 1 or FIG. 2.

FIG. 3 is a flowchart of a first particular embodiment of a method 300 of operation at a computing device. In an illustrative embodiment, the method 300 may be performed by the computing device 110 of FIGS. 1-2.

The method 300 may include receiving a video stream at a computing device, at 302, and receiving user input indicating a value of a local encoding parameter and a value of a remote encoding parameter, at 304. For example, referring to FIG. 1, the computing device 110 may receive the video stream 104 and the user input 118.

The method 300 may also include encoding the video stream at the computing device based on the value of the local encoding parameter to generate a first encoded stream, at 306. For example, the encoder(s) 114 may generate the first encoded stream(s) 120.

The method 300 may also include sending the first encoded stream and the value of the remote encoding parameter to a media server, at 308. The media server may be configured to generate a second encoded stream based on the value of the remote encoding parameter and the first encoded stream. For example, the computing device 110 may send the first encoded stream(s) 120 and the remote encoding parameter value(s) 130 to the media server 150, and the media server 150 may generate the second encoded stream(s) 162. The media server 150 may also offer one or more of the first encoded stream(s) 120 and/or one or more of the second encoded stream(s) 162 as the adaptive bitrate renditions 165 available for adaptive bitrate streaming to destination devices.

Figure 4:
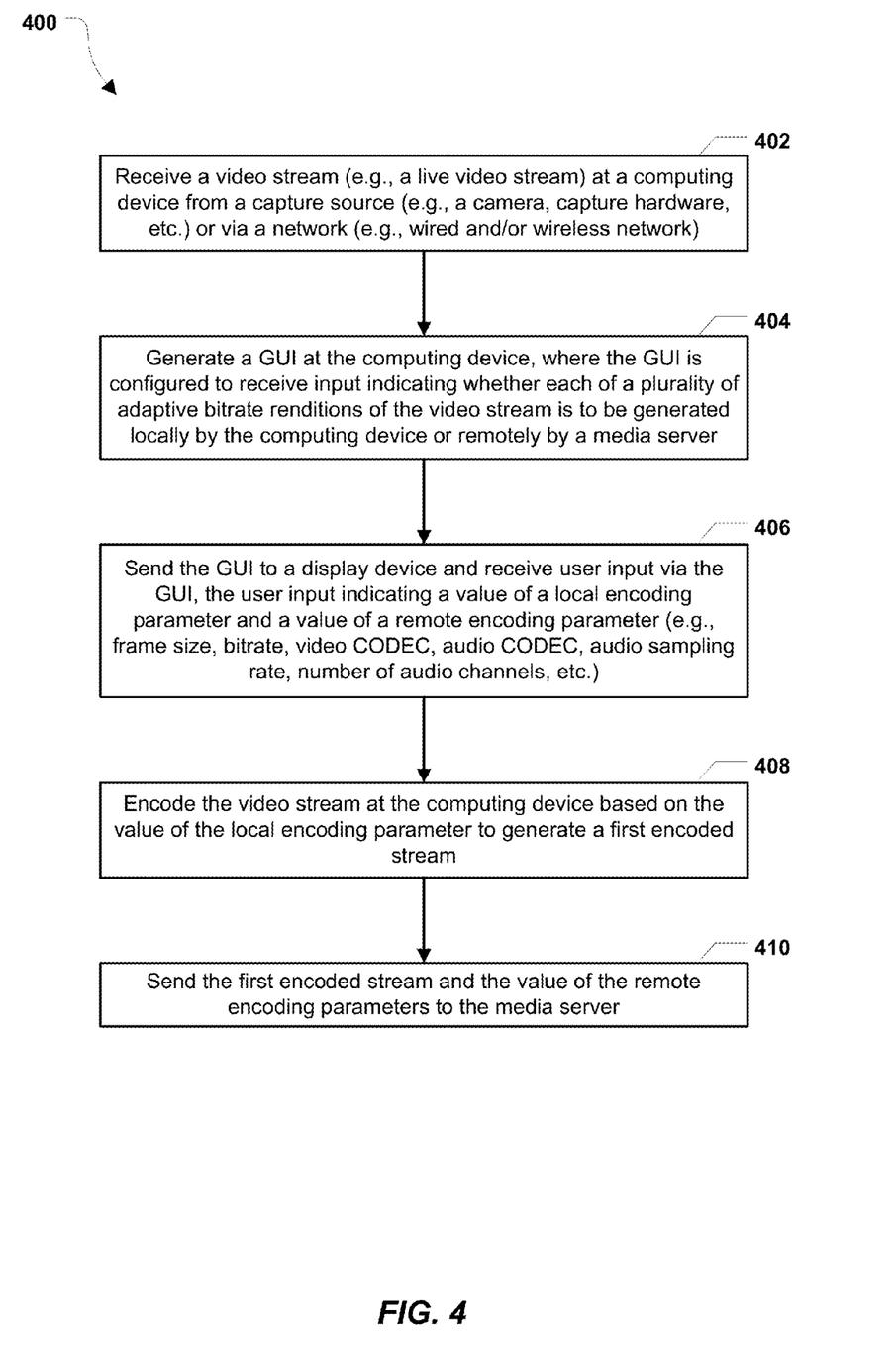
FIG. 4 is a flowchart of a second particular embodiment of a method of operation at the computing device of FIG. 1 or FIG. 2.

FIG. 4 is a flowchart of a second particular embodiment of a method 400 of operation at a computing device. In an illustrative embodiment, the method 400 may be performed by the computing device 110 of FIGS. 1-2.

The method 400 may include receiving a video stream (e.g., a live video stream) at a computing device, at 402. The video stream may be a live video stream received from a capture source, such as a camera or capture hardware. For example, the live video stream may be captured by a camera at the site of a live event, such as a sporting event, a music concert, a business presentation, a university lecture, a religious service, etc. Alternately, the live video stream may be received via a network. For example, the live video stream may be an international television channel or other video stream received via satellite.

The method 400 may also include generating a GUI at the computing device, at 404. The GUI may be configured to receive input indicating whether each of a plurality of adaptive bitrate renditions of the video stream is to be generated locally by the computing device or remotely by a media server. For example, referring to FIG. 1, the computing device 110 may generate the GUI 115.

The method 400 may further include sending the GUI to a display device and receiving user input via the GUI, at 406. The user input may indicate a value of a local encoding parameter and a value of a remote encoding parameter (e.g., frame size, bitrate, video CODEC, audio CODEC, audio sampling rate, number of audio channels, etc.). For example, the computing device 110 may receive the user input 118.

The method 400 may include encoding the video stream at the computing device based on the value of the local encoding parameter to generate a first encoded stream, at 408. For example, the encoder(s) 114 may generate the first encoded stream(s) 120 based on the remote encoding parameter value(s) 130. To illustrate, while generating the first encoded stream(s) 120, the encoder(s) 114 may select a particular output bitrate or frame size, and/or apply a particular video or audio CODEC, etc., as specified by the remote encoding parameter value(s) 130.

The method 400 may also include sending the first encoded stream and the value of the remote encoding parameter to a media server, at 410. For example, the computing device 110 may send the first encoded stream(s) 120 and the remote encoding parameter value(s) 130 to the media server 150.

Figure 5:
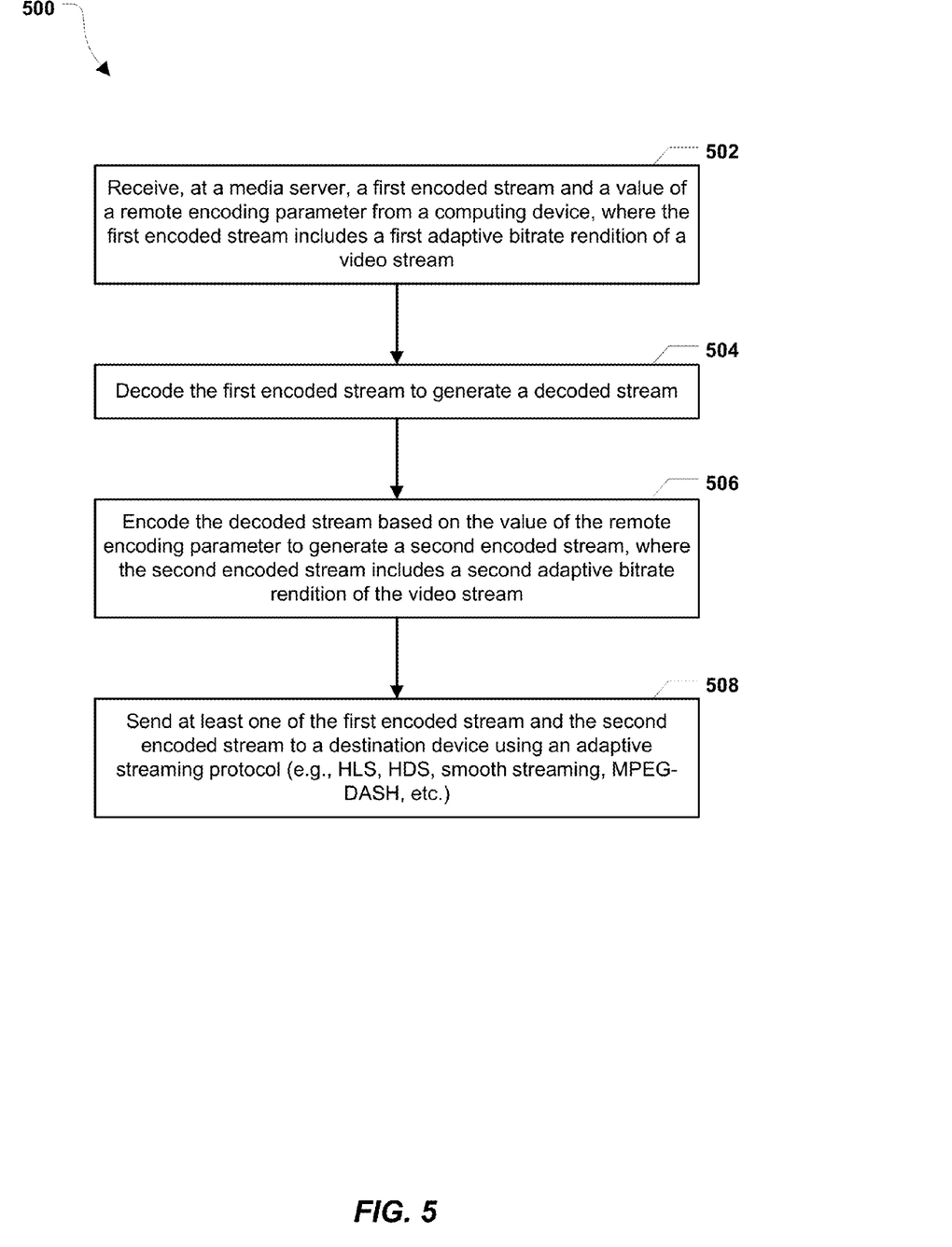
FIG. 5 is a flowchart of a particular embodiment of a method of operation at the media server of FIG. 1 or FIG. 2.

FIG. 5 is a flowchart of a particular embodiment of a method 500 of operation at a media server. In an illustrative embodiment, the method 500 may be performed by the media server 150 of FIGS. 1-2.

The method 500 may include receiving, at a media server, a first encoded stream and a value of a remote encoding parameter from a computing device, at 502. The first encoded stream may include a first adaptive bitrate rendition of a video stream. For example, referring to FIG. 1, the media server 150 may receive the first encoded stream(s) 120 and the remote encoding parameter value(s) 130 from the computing device 110.

The method 500 may also include decoding the first encoded stream to generate a decoded stream, at 504, and encoding the decoded stream based on the value of the remote encoding parameter to generate a second encoded stream, at 506. The second encoded stream may include a second adaptive bitrate rendition of the video stream. For example, the media server 150 may decode the first encoded stream(s) 120 to generate the decoded stream 161 and may encode the decoded stream 161 to generate the second encoded stream(s) 162.

The method 500 may further include sending at least one of the first encoded stream and the second encoded stream to a destination device using an adaptive streaming protocol, at 508. For example, the media server 150 may send the adaptive bitrate rendition(s) 165 to a destination device. In a particular embodiment, the adaptive streaming protocol is HLS, HDS, smooth streaming, or MPEG-DASH.

It should be noted that the order of steps illustrated in the flowcharts of FIGS. 3-5 are to be considered illustrative, not limiting. In alternate embodiments, the order of steps may be different. Further, one or more steps may be optional and/or replaced by other steps. In addition, one or more steps may be consolidated.

Although one or more embodiments described with reference to FIGS. 1-5 illustrate distributed encoding of live streams, variations of the described embodiments may be used to configure and perform distributed encoding of non-live streams, such as video on demand streams. As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device (e.g., the data storage device 259 of the media server 150 or a data storage device remote to the media server 150). A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). Thus, distributed encoding may be used to generate adaptive streaming renditions of VOD streams or digital video recorder (DVR) streams as well as live streams.

In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the computing device 110 of FIGS. 1-2, the media server 150 of FIGS. 1-2, the desktop/laptop computing device 271 of FIG. 2, the TV/set-top box 272 of FIG. 2, the smartphone 273 of FIG. 2, the tablet computer 274 of FIG. 2, the media server/stream relay server 281 of FIG. 2, a server (e.g., edge server) of the CDN 282 of FIG. 2, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a non-transitory computer-readable or a processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. For example, a computer-readable or processor-readable medium or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM), digital versatile disc (DVD), etc.), a tape-based memory, or any other form of storage medium or device.

In a particular embodiment, a method includes receiving a video stream at a computing device. The method also includes receiving user input indicating a value of a local encoding parameter and a value of a remote encoding parameter. The method further includes encoding the video stream at the computing device based on the value of the local encoding parameter to generate a first encoded stream. The method includes sending the first encoded stream and the value of the remote encoding parameter to a media server. The media server is configured to generate a second encoded stream based on the value of the remote encoding parameter and the first encoded stream.

In another particular embodiment, an apparatus includes a processor and a memory storing instructions that, when executed by the processor, cause the processor to perform operations including receiving, at a computing device, user input indicating whether each of a plurality of adaptive bitrate renditions of a video stream is to be generated by the computing device or by a media server. When the user input indicates that a first adaptive bitrate rendition of the video stream is to be generated by the computing device, the operations include encoding the video stream at the computing device based on a value of a first encoding parameter to generate a first encoded stream, and sending the first encoded stream and a value of a second encoding parameter to a media server. The first encoded stream includes the first adaptive bitrate rendition and the media server is configured to generate a second encoded stream based on the value of the second encoding parameter and the first encoded stream.

In another particular embodiment, a computer-readable storage device stores instructions that, when executed by a computer, cause the computer to perform operations including receiving, at a media server, a first encoded stream and a value of a remote encoding parameter from a computing device. The first encoded stream includes a first adaptive bitrate rendition of a video stream. The operations also include decoding the first encoded stream to generate a decoded stream. The operations further include encoding the decoded stream based on the value of the remote encoding parameter to generate a second encoded stream. The second encoded stream includes a second adaptive bitrate rendition of the video stream. The operations include sending at least one of the first encoded stream and the second encoded stream to a destination device using an adaptive streaming protocol.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving input from a single external source at a computing device, wherein the input indicates a value of a local encoding parameter, indicates a value of a remote encoding parameter, and identifies a first subset of streams and a second subset of streams, the first subset and the second subset corresponding to renditions of an output video stream;
   encoding an input video stream at the computing device based on the value of the local encoding parameter to generate the first subset of streams; and
   sending, to a media server, the first subset of streams and the value of the remote encoding parameter, wherein the first subset of streams includes a particular rendition of the video stream generated using a lossless encoding scheme, and wherein the media server is configured to generate the second subset of streams based on the value of the remote encoding parameter and based on the particular rendition.

2. The method of claim 1, further comprising generating a manifest at the computing device based on the input and sending the manifest to the media server.

3. The method of claim 1, wherein each stream of the second subset of streams is key frame aligned with respect to the particular rendition.

4. The method of claim 1, wherein the first subset is encoded at the computing device but not at the media server and the second subset is encoded at the media server but not at the computing device.

5. The method of claim 1, wherein at least one of the local encoding parameter or the remote encoding parameter includes a frame size, a bitrate, a selection of a video coder/decoder (CODEC), a selection of an audio CODEC, an audio sampling rate, or a number of audio channels, and wherein the media server is one of a plurality of devices included in a computing cloud.

6. The method of claim 1, wherein the single external source comprises a keyboard, a mouse, a camera, a touch-screen, or capture hardware that is physically connected to the computing device.

7. The method of claim 1, further comprising:
receiving, at the computing device, the video stream; and
encoding, at the computing device, the first subset of streams based on the local encoding parameter and the video stream.

8. The method of claim 1, further comprising determining at least one default encoding parameter value at the computing device based on relative computing capabilities of the computing device and the media server, an available bandwidth of a network between the computing device and the media server, or a combination thereof.

9. The method of claim 1, wherein the first subset includes no renditions of the video stream other than the particular rendition.

10. The method of claim 1, wherein the second subset of streams is available for playback at one or more client devices and wherein the single source is distinct from the one or more client devices.

11. The method of claim 1, wherein the first subset of streams includes a first plurality of adaptive bitrate renditions of the video stream, wherein the second subset of streams includes a second plurality of adaptive bitrate renditions of the video stream, and wherein each bitrate of each rendition of the first plurality of adaptive bitrate renditions is different from each bitrate of each rendition of the second plurality of adaptive bitrate renditions.

12. An apparatus comprising:
a processor; and
a memory storing instructions that, when executed by the processor, cause the processor to perform operations comprising:
receiving, at the processor from a single external source, input, wherein the input indicates a value of a local encoding parameter, indicates a value of a remote encoding parameter, and identifies a first subset of streams and a second subset of streams, the first subset and the second subset corresponding to renditions of an output video stream;
encoding an input video stream at the processor based on the value of the local encoding parameter to generate the first subset of streams; and
initiating transmission of the first subset of streams and the value of the remote encoding parameter to a media server, wherein the first subset includes a particular rendition of the video stream generated using a lossless encoding scheme, and wherein the media server is configured to generate the second subset of streams based on the value of the remote encoding parameter and based on the particular rendition.

13. The apparatus of claim 12, wherein the processor is located at a capture site of the video stream.

14. The apparatus of claim 12, wherein the second subset of streams includes a plurality of adaptive bitrate renditions of the video stream.

15. The apparatus of claim 12, wherein at least one stream of the first subset comprises an audio-only stream.

16. A non-transitory computer-readable storage device storing instructions that, when executed by a processor, cause the processor to perform operations comprising:
receiving input at a computing device from a single external source, wherein the input indicates a value of a local encoding parameter, indicates a value of a remote encoding parameter, and identifies a first subset of streams and a second subset of streams, the first subset and the second subset corresponding to renditions of an output video stream;
encoding an input video stream at the computing device based on the value of the local encoding parameter to generate the first subset of streams; and
initiating transmission to a media server of the first subset of streams and the value of the remote encoding parameter, wherein the first subset includes a particular rendition of the video stream generated using a lossless encoding scheme, and wherein the media server is configured to generate the second subset based on the value of the remote encoding parameter and based on the particular rendition.

17. The non-transitory computer-readable storage device of claim 16, wherein at least one encoded stream of the first subset of streams comprises an audio-only stream.

18. The non-transitory computer-readable storage device of claim 16, wherein the media server is configured to send a particular encoded stream to a destination device using an adaptive streaming protocol that includes at least one of:
hypertext transfer protocol (HTTP) live streaming (HLS),
HTTP dynamic streaming (HDS),
smooth streaming, or
motion picture experts group (MPEG) dynamic adaptive streaming over HTTP (MPEG-DASH).

19. The non-transitory computer-readable storage device of claim 16, wherein the media server is configured to generate an adaptive streaming manifest, wherein the adaptive streaming manifest identifies the first subset of streams and the second subset of streams.

20. The non-transitory computer-readable storage device of claim 16, wherein each of the first subset of streams has a bitrate that is greater than a bitrate of each of the second subset of streams.

* * * * *